(12) United States Patent
Huang et al.

(10) Patent No.: US 11,884,249 B2
(45) Date of Patent: Jan. 30, 2024

(54) ANTI-LOCK BRAKE DEVICE FOR BICYCLE

(71) Applicant: TEKTRO TECHNOLOGY CORPORATION, Changhua County (TW)

(72) Inventors: Po-Hsien Huang, Changhua County (TW); Tzu-Chang Wang, Changhua County (TW)

(73) Assignee: TEKTRO TECHNOLOGY CORPORATION, Changhua County (TW)

( * ) Notice: Subject to any disclaimer, the term of this patent is extended or adjusted under 35 U.S.C. 154(b) by 1053 days.

(21) Appl. No.: 16/741,851

(22) Filed: Jan. 14, 2020

(65) Prior Publication Data

US 2020/0324752 A1 Oct. 15, 2020

(30) Foreign Application Priority Data

Apr. 10, 2019 (TW) .................................. 108112512

(51) Int. Cl.
| | |
|---|---|
| *B60T 15/02* | (2006.01) |
| *B60T 8/176* | (2006.01) |
| *B60T 8/17* | (2006.01) |
| *F16K 1/36* | (2006.01) |
| *F16K 1/12* | (2006.01) |
| *B62L 3/02* | (2006.01) |

(52) U.S. Cl.
CPC ............ *B60T 15/028* (2013.01); *B60T 8/176* (2013.01); *B60T 8/1706* (2013.01); *B62L 3/023* (2013.01); *F16K 1/123* (2013.01); *F16K 1/36* (2013.01); *B60T 2270/10* (2013.01)

(58) Field of Classification Search
CPC ...... B60T 15/028; B60T 8/176; B60T 8/1706; B60T 2270/10; F16K 1/36; F16K 1/123; B62L 3/023

See application file for complete search history.

(56) References Cited

U.S. PATENT DOCUMENTS

2019/0084538 A1* 3/2019 Wang ........................ B62J 45/41

FOREIGN PATENT DOCUMENTS

EP 3366536 A1 * 8/2018

* cited by examiner

*Primary Examiner* — Vishal R Sahni
(74) *Attorney, Agent, or Firm* — Locke Lord LLP; Tim Tingkang Xia, Esq.

(57) ABSTRACT

The disclosure provides an anti-lock brake device including an oil pressure tank, a valve, and a movable component. The oil pressure tank has an accommodation space, an oil inlet channel, and an oil outlet channel connected to the accommodation space. The valve is slidably located in the oil inlet channel and for sealing or opening an oil inlet of the oil inlet channel. The movable component is located in the accommodation space and has a connecting channel corresponding to the oil inlet and an oil outlet of the oil outlet channel. When the movable component is slid to a depressurized position, the movable component is moved away from the valve for sealing the oil inlet, a first volume is produced between the connecting channel and the oil inlet, and a second volume, smaller than the first volume, is removed from between the connecting channel and the oil outlet.

25 Claims, 7 Drawing Sheets

ANTI-LOCK BRAKE DEVICE FOR BICYCLE

CROSS-REFERENCE TO RELATED APPLICATIONS

This non-provisional application claims priority under 35 U.S.C. § 119(a) on Patent Application No(s). 108112512 filed in Taiwan, R.O.C on Apr. 10, 2019, the entire contents of which are hereby incorporated by reference.

TECHNICAL FIELD

The disclosure relates to an anti-lock brake device, more particularly to an anti-lock brake device for bicycle.

BACKGROUND

In recent years, road bikes, mountain bikes and other types of bikes become more and more popular so that the manufacturers pay more attention on developing new and market-oriented products in order to provide costumers a better riding experience and a more stylish appearance of bicycle. However, in the safety aspect, the conventional bikes in the market still need to be improved.

Brake system is one of the most important factors to the bicycle safety. The caliper is the most commonly used mean in the brake system. The caliper is disposed near a brake disk which is rotatable with a bicycle wheel, and it is able to clamp the brake disk to stop the rotation of the bicycle wheel as the rider squeeze the brake lever.

SUMMARY OF THE INVENTION

One embodiment of the disclosure provides an anti-lock brake device for bicycle. The anti-lock brake device includes an oil pressure tank, a valve, and a movable component. The oil pressure tank has an accommodation space, an oil inlet channel, and an oil outlet channel, and the oil inlet channel and the oil outlet channel are connected to the accommodation space. The valve is slidably located in the oil inlet channel and configured to seal or open an oil inlet connected to the oil inlet channel. The movable component is located in the accommodation space. The movable component has a connecting channel. Two opposite ends of the connecting channel respectively correspond to the oil inlet and an oil outlet of the oil outlet channel. The movable component is slidable between an initial position and a depressurized position, and the movable component in the depressurized position is located closer to the oil outlet channel than that in the initial position. When the movable component is in the initial position, the movable component presses against the valve so as to open the oil inlet. When the movable component is slid from the initial position to the depressurized position, the movable component is moved away from the valve, the valve seals the oil inlet, a first volume is produced between the connecting channel and the oil inlet, and a second volume is removed from between the connecting channel and the oil outlet. The first volume is larger than the second volume, and a difference between the first volume and the second volume creates a depressurized volume.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

In the figures of the disclosure, cross-sectional surfaces of components are presented as inclined lines and dashes, which merely means that those are different components, but not mean that those components are different in material.

Figure 1:
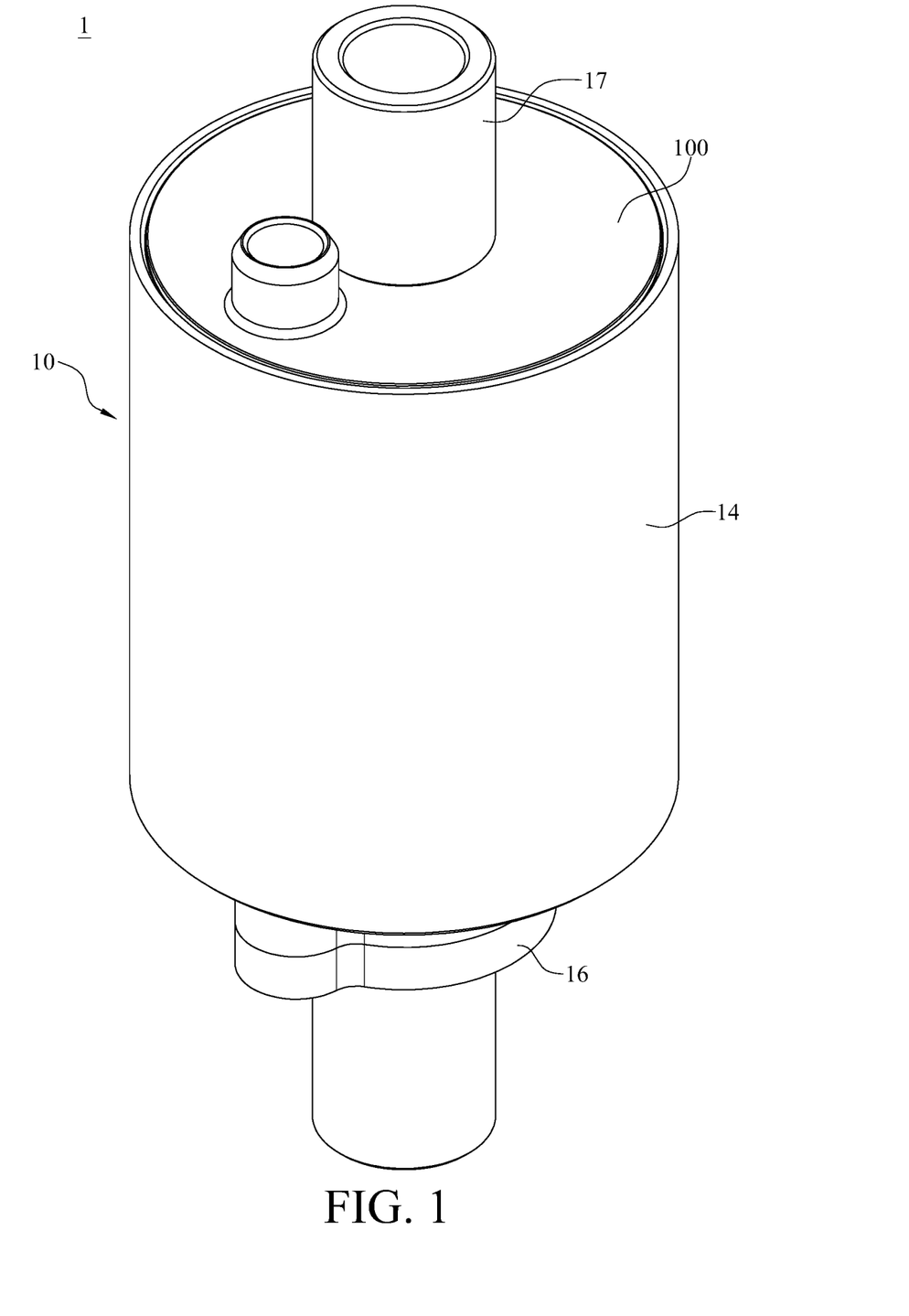
FIG. 1 is a perspective view of an anti-lock brake device for bicycle according to one embodiment of the disclosure.
Figure 2:
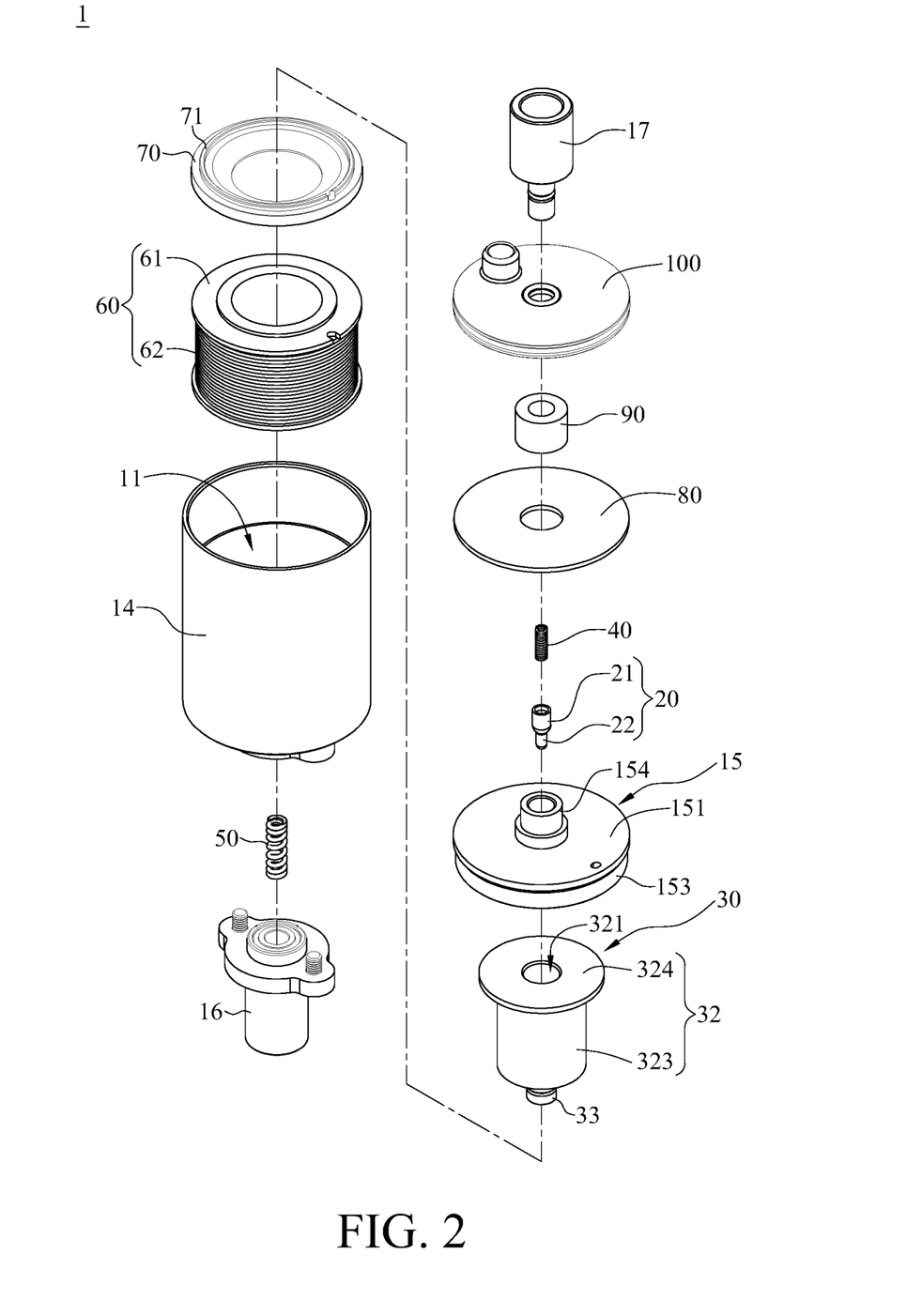
FIG. 2 is an exploded view of the anti-lock brake device in FIG. 1.
Figure 3:
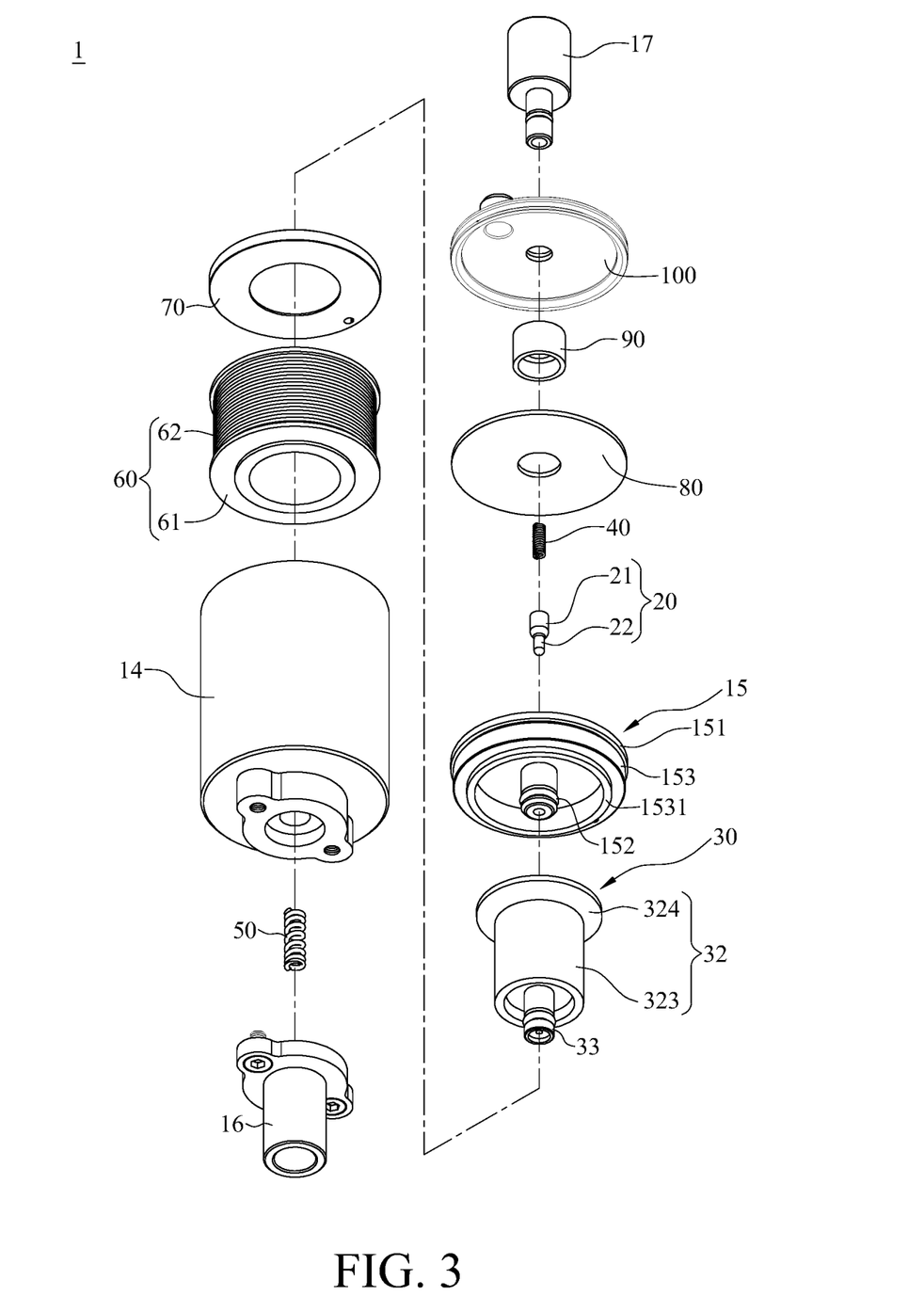
FIG. 3 is another exploded view of the anti-lock brake device in FIG. 1.
Figure 4:
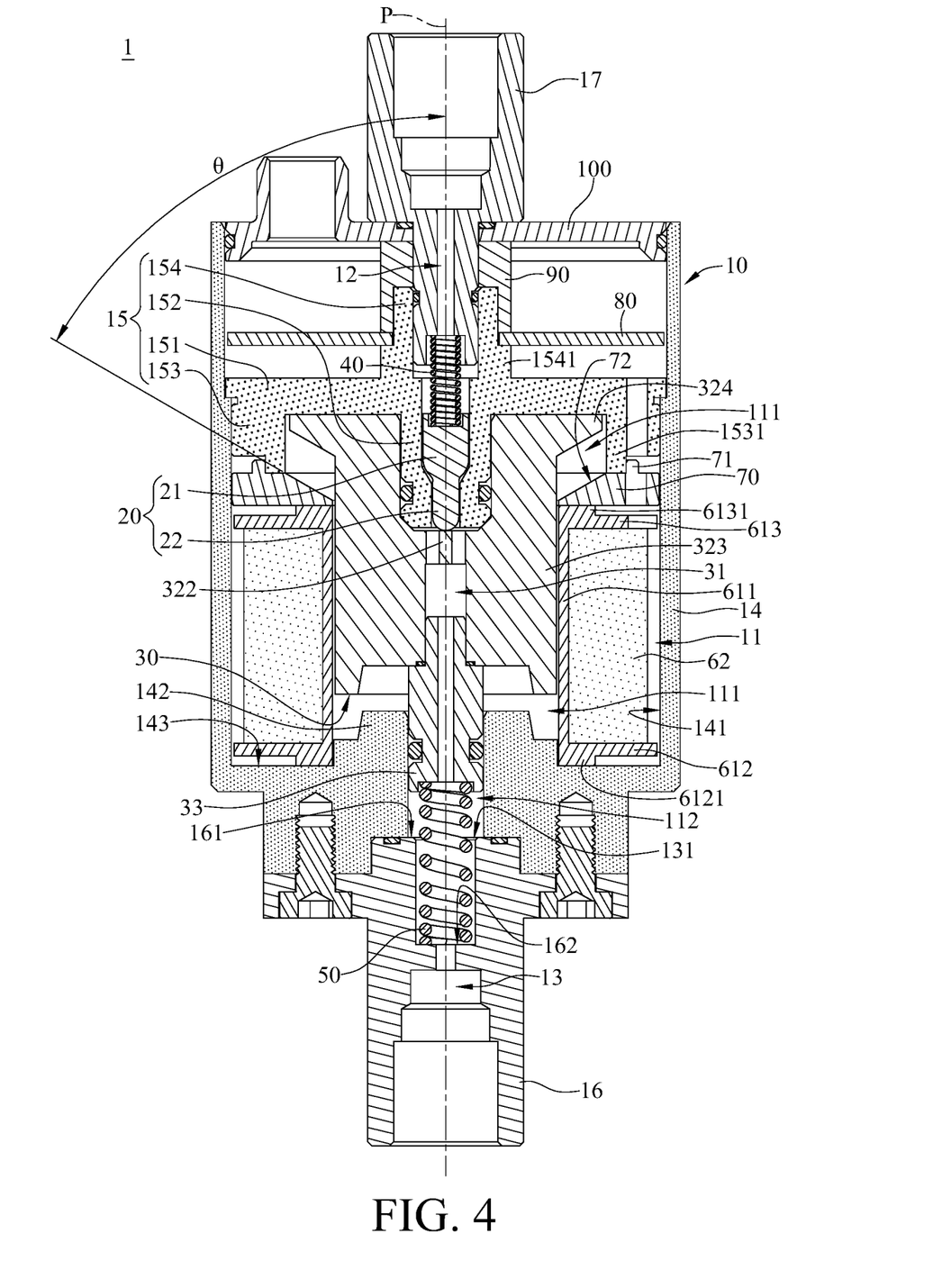
FIG. 4 is a cross-sectional view of the anti-lock brake device in FIG. 1.

Referring to FIGS. 1 to 4, FIG. 1 is a perspective view of an anti-lock brake device 1 according to one embodiment of the disclosure, FIG. 2 is an exploded view of the anti-lock brake device 1 in FIG. 1, FIG. 3 is another exploded view of the anti-lock brake device 1 in FIG. 1, and FIG. 4 is a cross-sectional view of the anti-lock brake device 1 in FIG. 1.

In this embodiment, the anti-lock brake device 1 includes an oil pressure tank 10, a valve 20, and a movable component 30. In addition, in this or other embodiments, the anti-lock brake device 1 may further include two elastic components 40 and 50, a magnetic force generator 60, a magnetically conductive plate 70, a circuit board 80, a fix sleeve 90, and a water-proof cover 100.

The oil pressure tank 10 has an accommodation space 11, an oil inlet channel 12, and an oil outlet channel 13, where the oil inlet channel 12 and the oil outlet channel 13 are connected to the accommodation space 11. The oil pressure tank 10 includes a main body 14, a mount component 15, a first pipe connector 16, and a second pipe connector 17. The mount component 15 includes a plate portion 151, a guide pillar portion 152, an annular wall portion 153, and a mount pillar portion 154. The plate portion 151 is mounted on the main body 14, and the plate portion 151 and the main body 14 together form an accommodation space 11 therebetween. The guide pillar portion 152 and the annular wall portion 153 are connected to the same surface of the plate portion 151 and are located in the accommodation space 11. The mount pillar portion 154 is connected to a side of the plate portion 151 away from the guide pillar portion 152; that is, the mount pillar portion 154 and the guide pillar portion 152 are connected to two opposite sides of the plate portion 151. The first pipe connector 16 is mounted on the main body 14, and the oil outlet channel 13 penetrates through the first pipe connector 16. The second pipe connector 17 is mounted on the mount pillar portion 154, and the oil inlet channel 12 penetrates through the second pipe connector 17, the mount pillar portion 154, the plate portion 151 and the guide pillar portion 152.

In general, the oil inlet channel 12 and the oil outlet channel 13 are respectively connected to a bicycle brake lever (not shown) and a bicycle brake caliper (not shown) via, for example, tubing (not shown).

In this embodiment, the valve 20 is slidably located in the oil inlet channel 12 to seal or open an oil inlet 121 of the oil inlet channel 12. The maximum width of the oil inlet channel 12 is larger than the maximum width of the valve 20, and the width of the oil inlet 121 is narrower than the maximum width of the valve 20. In detail, the oil inlet channel 12 has a wide portion 122 and a narrow portion 123 connected to each other, and a width W1 of the wide portion 122 is larger than a width W2 of the narrow portion 123. An end of the narrow portion 123 away from the wide portion 122 is connected to the accommodation space 11, and the oil inlet 121 is located at the narrow portion 123. The valve 20 includes a wide portion 21 and a narrow portion 22 connected to each other, and a width W3 of the wide portion 21 of the valve 20 is larger than a width W4 of the narrow portion 22 of the valve 20. The width W3 of the wide portion 21 of the valve 20 is smaller than the width W1 of the wide portion 122 of the oil inlet channel 12 and is larger than the width W2 of the narrow portion 123 of the oil inlet channel 12. The width W4 of the narrow portion 22 of the valve 20 is smaller than the width W2 of the narrow portion 123 of the oil inlet channel 12. The narrow portion 22 of the valve 20 is movably located in the narrow portion 123. The wide portion 21 of the valve 20 can be used to seal or open the oil inlet 121.

The second pipe connector 17 has a contact surface 171 facing the valve 20. The elastic component 40 is, for example, a compression spring. The elastic component 40 is located in the oil inlet channel 12, and two opposite ends of the elastic component 40 respectively press against the contact surface 171 and the wide portion 21 of the valve 20. The elastic component 40 is configured to force the valve 20 to slide and seal the oil inlet 121 of the valve 20.

Then, referring to FIGS. 2 to 5, FIG. 5 is a partial enlarged view of the bicycle anti-lock brake device 1 in FIG. 4.

In this embodiment, the movable component 30 is slidably located in the accommodation space 11. In specific, the accommodation space 11 has a first accommodation portion 111 and a second accommodation portion 112 connected to each other. The movable component 30 has a connecting channel 31, and the movable component 30 includes a driven part 32 and a protrusion part 33 connected to each other. The driven part 32 is located in the first accommodation portion 111, and the protrusion part 33 is located in the second accommodation portion 112. The connecting channel 31 penetrates through the driven part 32 and the protrusion part 33. The driven part 32 has a guide recess 321 and a press portion 322. The guide recess 321 has a wide portion 3211 and a tapered portion 3212. Two opposite ends of the tapered portion 3212 are respectively connected to the wide portion 3211 and the connecting channel 31, and a width of the tapered portion 3212 decreases towards the connecting channel 31. The guide pillar portion 152 of the mount component 15 is inserted into the guide recess 321 of the driven part 32, and the driven part 32 surrounds at least part of the valve 20. One end of the connecting channel 31 corresponds to the oil inlet 121, and a first chamber 321a is formed between the connecting channel 31 and the oil inlet 121 at the guide recess 321. The press portion 322 is located at the end of the connecting channel 31 close to the tapered portion 3212, and is configured to press against the narrow portion 22 of the valve 20.

Figure 5:
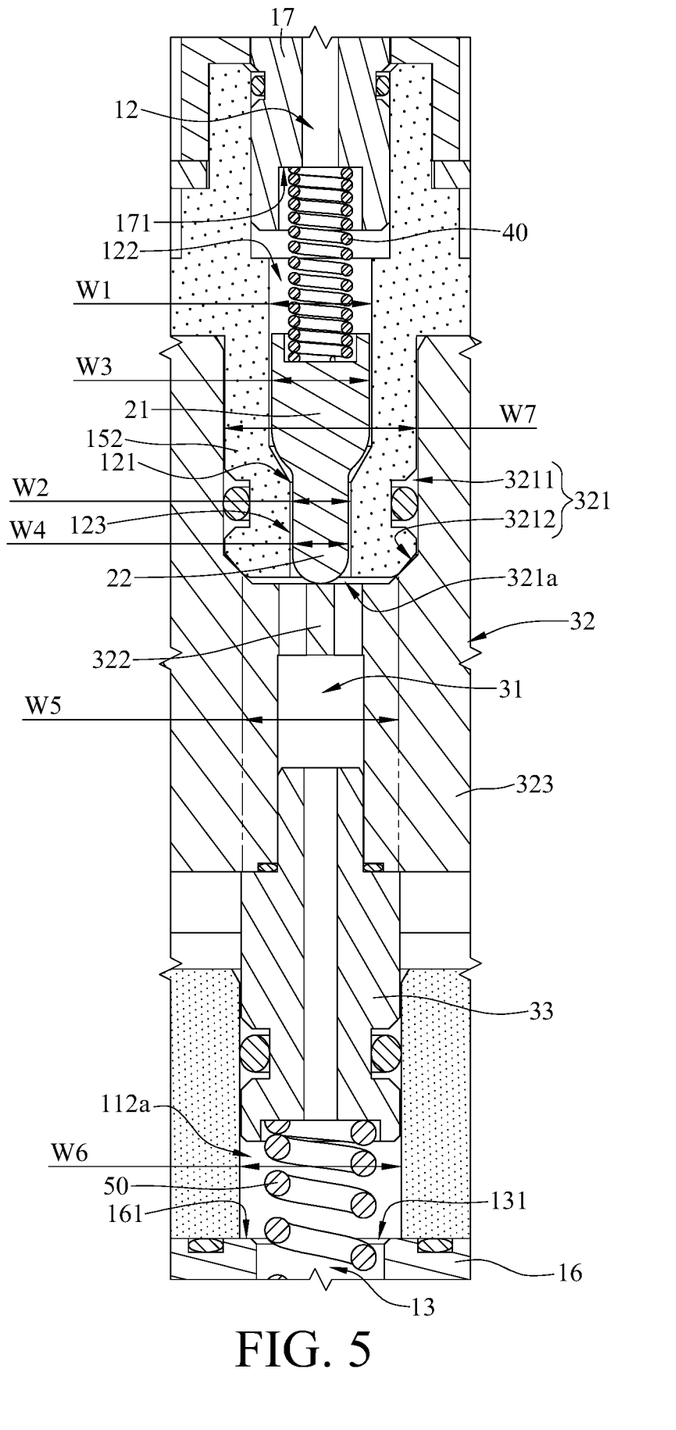
FIG. 5 is a partial enlarged view of the anti-lock brake device in FIG. 4.

Moreover, the other end of the connecting channel 31 away from the tapered portion 3212 corresponds to an oil outlet 131 connected to the oil outlet channel 13, and a second chamber 112a is formed between the connecting channel 31 and the oil outlet 131 at the second accommodation portion 112. A width W5 of a part of the tapered portion 3212 of the guide recess 321 is smaller than a width W6 of the second chamber 112a, and a width W7 of the wide portion 3211 of the guide recess 321 is larger than the width W6 of the second chamber 112a. Since the second chamber 112a is formed at the second accommodation portion 112, the second chamber 112a and the second accommodation portion 112 have the same width W6. In such an arrangement, it is understood that the width W5 of a part of the tapered portion 3212 is smaller than the width W6 of the second accommodation portion 112, and the width W7 of the wide portion 3211 is larger than the width W6 of the second accommodation portion 112.

In this embodiment, the first pipe connector 16 has a stop surface 161 and a contact surface 162 facing the protrusion part 33. The stop surface 161 is located at a position where the oil outlet channel 13 is connected to the second accommodation portion 112 and surrounds the oil outlet 131, and the stop surface 161 is located closer to the protrusion part 33 than the contact surface 162. The stop surface 161 is configured to limit the slidable movement of the movable component 30. The elastic component 50 is, for example, a compression spring. Two opposite ends of the elastic component 50 respectively press against the contact surface 162 and the protrusion part 33. The elastic component 50 is configured to force the protrusion part 33 to move toward the valve 20.

The magnetic force generator 60 is disposed in the accommodation space 11 and surrounds the driven part 32 of the movable component 30. More specifically, the magnetic force generator 60 includes a spool 61 and a magnetic coil 62, and the driven part 32 of the movable component 30 includes a cylinder portion 323 and a flange portion 324 radially protruding from the cylinder portion 323. The connecting channel 31 penetrates through the cylinder portion 323, the guide recess 321 is located at the cylinder portion 323, and the press portion 322 is connected to the cylinder portion 323. The spool 61 is sleeved on the cylinder portion 323 of the driven part 32, and the spool 61 includes a shaft part 611, a first plate part 612, and a second plate part 613. The shaft part 611 is located between and connected to the first plate part 612 and the second plate part 613, and the first plate part 612 and the second plate part 613 may be the same in width and are both wider than the shaft part 611. The magnetic coil 62 is wound on the shaft part 611 and is located between the first plate part 612 and the second plate part 613.

In this embodiment, the main body 14 of the oil pressure tank 10 has an annular inner surface 141 and an annular positioning block 142. The annular inner surface 141 surrounds the accommodation space 11 and the annular positioning block 142, and the first plate part 612 is located between the annular positioning block 142 and the annular inner surface 141, such that the spool 61 is positioned between the annular positioning block 142 and the annular inner surface 141 and thus the spool 61 is prevented from interfering the movement of the driven part 32 of the movable component 30.

In addition, the main body 14 of the oil pressure tank 10 further has an inner side surface 143, and the inner side surface 143 is located between and connected to the annular inner surface 141 and the annular positioning block 142. The first plate part 612 of the spool 61 has an annular protrusion 6121, and the annular protrusion 6121 is in contact with the inner side surface 143. Furthermore, the second plate part 613 of the spool 61 also has an annular protrusion 6131. The magnetically conductive plate 70 is sleeved on the cylinder portion 323 of the driven part 32 and is located between the second plate part 613 of the spool 61 and the plate portion 151 of the mount component 15, and the annular protrusion 6131 of the second plate part 613 is in contact with the magnetically conductive plate 70.

In general, the spool 61 may be deformed while the magnetic coil 62 is wound on the shaft part 611 of the spool 61. In this embodiment, the annular protrusions 6121 and 6131 enable that the deformed spool 61 only contact the inner side surface 143 and the magnetically conductive plate 70 with a small surface so as to reduce the difficulty of the installation of the spool 61, the magnetically conductive plate 70 and other components.

In this embodiment, the magnetically conductive plate 70 has a first positioning protrusion 71 located at a side of the magnetically conductive plate 70 close to the plate portion 151 of the mount component 15, and the annular wall portion 153 of the mount component 15 has a second positioning protrusion 1531. The first positioning protrusion 71 and the second positioning protrusion 1531 are, for example, in a ring shape. The second positioning protrusion 1531 is in contact with the first positioning protrusion 71, and the second positioning protrusion 1531 is located closer to the guide pillar portion 152 of the mount component 15 than the first positioning protrusion 71. The first positioning protrusion 71 and the second positioning protrusion 1531 help to position the mount component 15 and the magnetically conductive plate 70, thus it prevents the mount component 15 and the magnetically conductive plate 70 from interfering the movement of the driven part 32.

Note that the quantity of the first positioning protrusion 71 in the magnetically conductive plate 70 is not restricted. In some other embodiments, the magnetically conductive plate may have two first positioning protrusions; in such a case, the two first positioning protrusions of the magnetically conductive plate may be in a block shape, and the two first positioning protrusions may be respectively in contact with two opposite sides of the second positioning protrusion.

The mount pillar portion 154 has a protrusion portion 1541. The mount pillar portion 154 is disposed through the circuit board 80, and the fix sleeve 90 is sleeved on the mount pillar portion 154. The circuit board 80 is located between and clamped by the fix sleeve 90 and the protrusion portion 1541 of the mount pillar portion 154. The circuit board 80 is electrically connected to the magnetic coil 62. The water-proof cover 100 is mounted on the main body 14 of the oil pressure tank 10 and is located at a side of the main body 14 away from the first pipe connector 16. The water-proof cover 100 is in contact with a side of the fix sleeve 90 away from the circuit board 80, and the water-proof cover 100 is clamped by the fix sleeve 90 and the second pipe connector 17.

Regarding the installations of the circuit board 80, the fix sleeve 90, the water-proof cover 100 and the second pipe connector 17, the first is to dispose the mount pillar portion 154 through the circuit board 80, then the fix sleeve 90 is sleeved on the mount pillar portion 154 so that the circuit board 80 is located between and clamped by the fix sleeve 90 and the protrusion portion 1541 of the mount pillar portion 154, then the water-proof cover 100 is mounted on the main body 14 to press against the fix sleeve 90, and then the second pipe connector 17 is disposed through the water-proof cover 100 and the fix sleeve 90 and is fixed to the mount pillar portion 154 so that the water-proof cover 100 is clamped by the second pipe connector 17 and the fix sleeve 90.

In this embodiment, the magnetically conductive plate 70, the main body 14 of the oil pressure tank 10, and the driven part 32 of the movable component 30 are all made of magnetically conductive materials. The magnetically conductive plate 70 has an inclined surface 72. The inclined surface 72 faces the flange portion 324 of the driven part 32, and the inclined surface 72 and a central line P of the cylinder portion 323 together form an acute angle θ therebetween. When the magnetic coil 62 is electrified, the magnetic coil 62 produces a magnetic force, and the magnetic force is applied on the flange portion 324 of the driven part 32 via the main body 14 and the inclined surface 72 of the magnetically conductive plate 70 so as to move the movable component 30 from an initial position to a depressurized position, where the movable component 30 in the depressurized position is located closer to the oil outlet channel 13 than when it is in the initial position.

As shown in FIGS. 4 and 5, when the movable component 30 is in the initial position, the protrusion part 33 of the movable component 30 is pressed against by the elastic component 50, such that the press portion 322 of the driven part 32 presses against the narrow portion 22 of the valve 20 to space apart the wide portion 21 of the valve 20 from the oil inlet 121 and thus opening the oil inlet 121. In such a case, when the bicycle brake lever is squeezed, an oil pressure is produced and transmitted to the bicycle brake caliper via the oil inlet channel 12, the first chamber 321a, the connecting channel 31, the second chamber 112a, and the oil outlet channel 13 for braking the bicycle.

Meanwhile, part of the tapered portion 3212 of the guide recess 321 defines the current first chamber 321a, and the maximum width W5 of the first chamber 321a is slightly smaller than the width W6 of the second chamber 112a. As such, an end of the protrusion part 33 away from the driven part 32 would experience a force from the oil pressure slightly larger than that the driven part 32 would experience from the same. As a result, the difference of force assists the elastic component 50 in pushing the movable component 30, such that a compression spring having a smaller elastic coefficient may be employed as the elastic component 50.

When a detecting device on the bicycle detects that the bicycle wheel is locked up, the circuit board 80 will let the magnetic coil 62 to be electrified to produce magnetic force. This magnetic force is transmitted to the driven part 32 of the movable component 30 via the main body 14 and the magnetically conductive plate 70, such that the movable component 30 is moved from the initial position to the depressurized position and deforms the elastic component 50.

Figure 6:
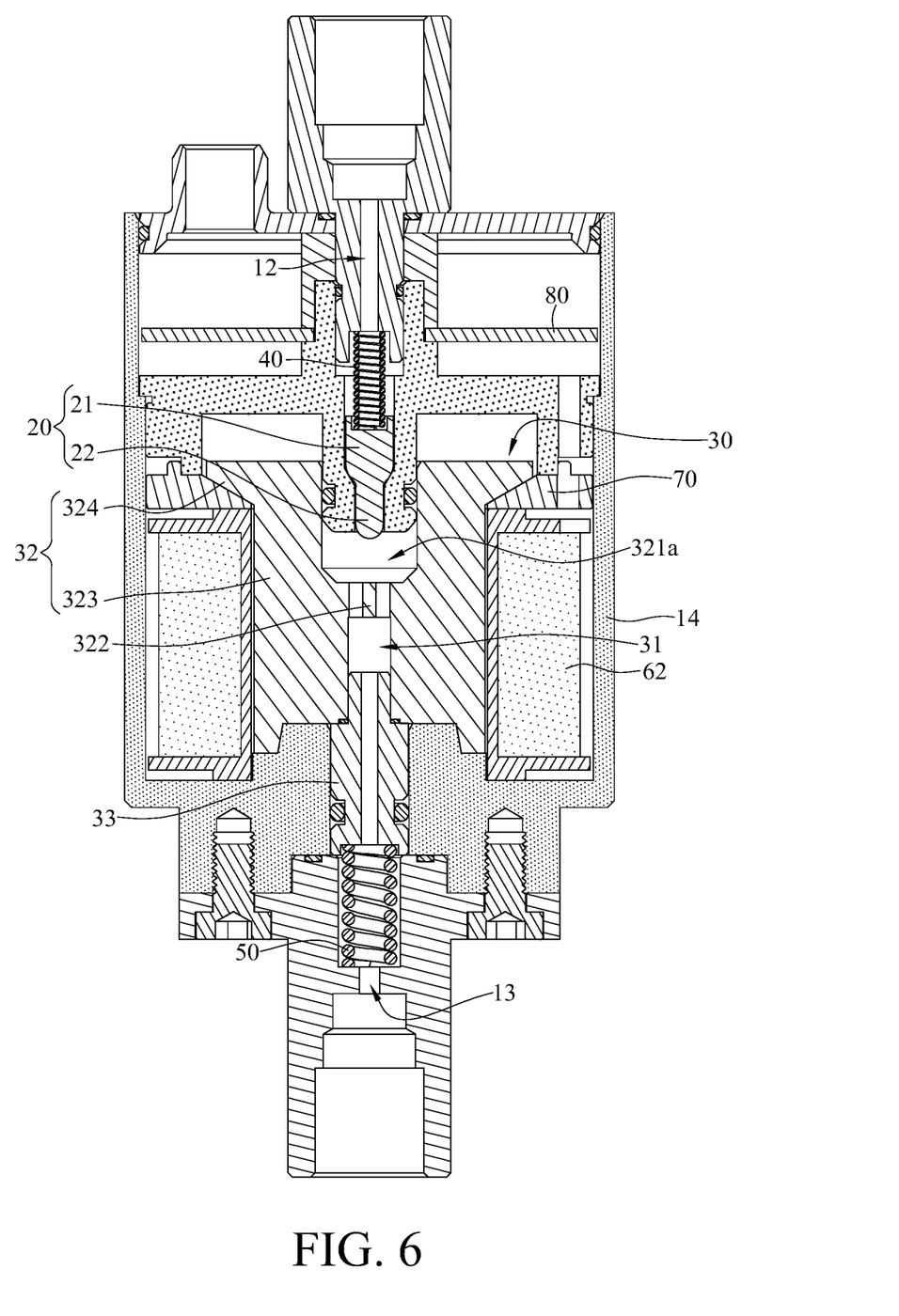
FIG. 6 is a cross-sectional view of the anti-lock brake device FIG. 1 when a movable component of the anti-lock brake device is in the depressurized position.
Figure 7:
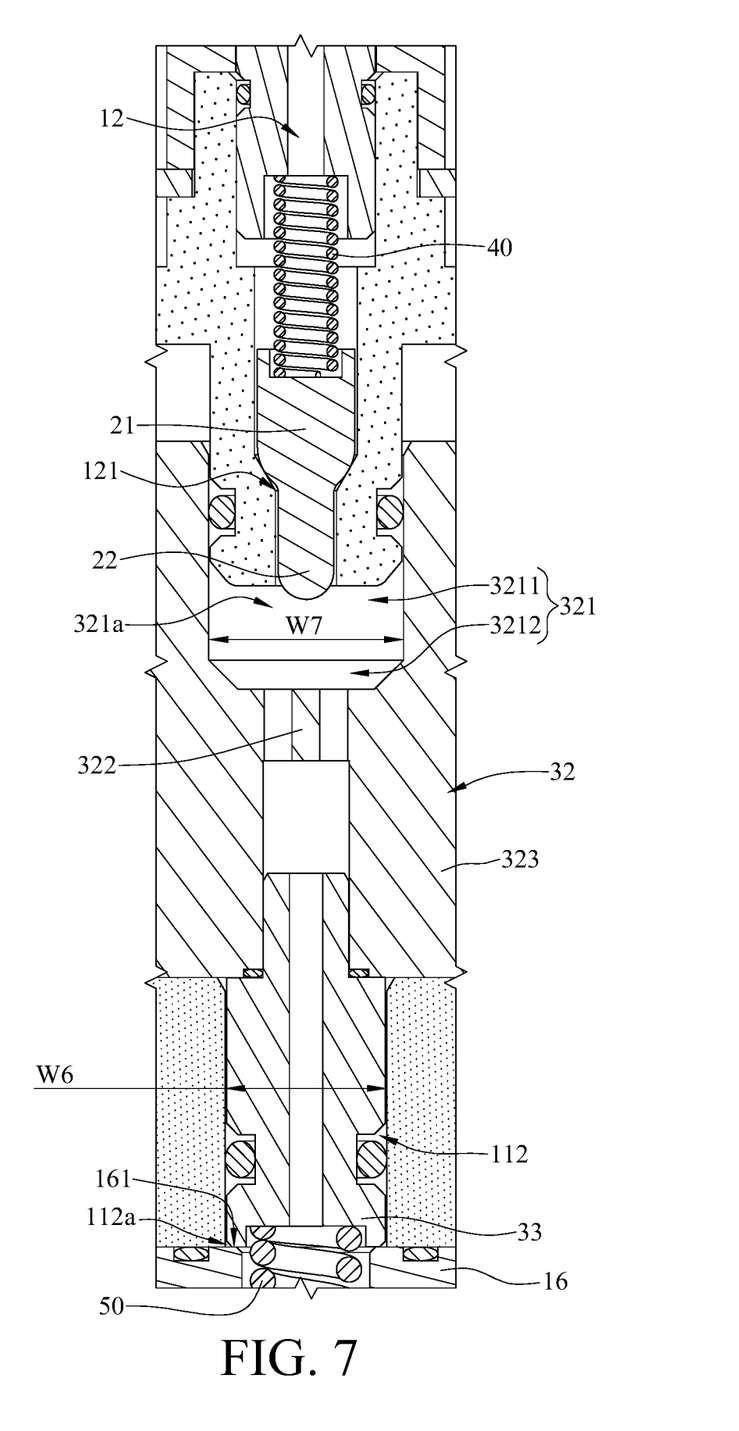
FIG. 7 is a partial enlarged view of the anti-lock brake device FIG. 6.

Referring to FIGS. 6 and 7, where FIG. 6 is a cross-sectional view of the bicycle anti-lock brake device 1 FIG. 1 when a movable component 30 of the anti-lock brake device 1 is in the depressurized position, and FIG. 7 is a partial enlarged view of the anti-lock brake device 1 FIG. 6.

During the movement of the movable component 30 from the initial position to the depressurized position, the press portion 322 of the driven part 32 is moved away from the narrow portion 22 of the valve 20, and then the elastic component 40 can force the valve 20 to move so as to block and seal the oil inlet 121 by the wide portion 21 of the valve 20. As a result, the oil inlet channel 12 is disconnected from the oil outlet channel 13. Also, the volume of the first chamber 321a is increased, and the volume of the second chamber 112a is decreased.

When the movable component 30 is in the depressurized position, the protrusion part 33 of the movable component 30 is in contact with the stop surface 161. At this moment, the first chamber 321a includes the tapered portion 3212 of the guide recess 321 and part of the wide portion 3211. In comparison, the first chamber 321a gains a first volume and the second chamber 112a loses a second volume and almost got eliminated as the movable component 30 is switched from the initial position to the depressurized position.

In this embodiment, the width W7 of the wide portion 3211 of the guide recess 321 is larger than the width W6 of the second accommodation portion 112, thus when the movable component 30 is moved from the initial position to the depressurized position, the first volume gained by the first chamber 321a is larger than the second volume lost by the second chamber 112a. Herein, define the difference between the first volume and the second volume is a depressurized volume for accommodating oil, where the depressurized volume is approximately equal to the difference between the cross-sectional areas of the wide portion 3211 of the guide recess 321 and the second accommodation portion 112 times the travel distance of the movable component 30. Therefore, the existence of the depressurized volume can decrease the oil pressure to slightly loosen the bicycle caliper, such that the bicycle wheel can be released and able to rotate. In short, the depressurized volume, created by the difference between the first chamber 321a and the second chamber 112a, can avoid the bicycle wheel from being locked up due to applying brakes too hard or too suddenly and thus preventing the rider from losing control of the bicycle.

When the detecting device detects that the bicycle wheel begins to rotates again, the circuit board 80 stops electrifying the magnetic coil 62. At this moment, the magnetic force applying on the movable component 30 is removed, then the elastic component 50 can spring the movable component 30 back to the initial position, and the press portion 322 of the driven part 32 pushes the narrow portion 22 of the valve 20 to make the wide portion 21 of the valve 20 open the oil inlet 121. As a result, the oil inlet channel 12 is connected to the oil outlet channel 13 again to allow the oil pressure to be transmitted to the bicycle caliper for braking the bicycle. Once the detecting device detects that the bicycle wheel is locked up again, then the aforementioned steps will be repeated until the brake of the bicycle stops.

According to the anti-lock brake device as discussed above, during the movement of the movable component from the initial position to the depressurized position, the oil inlet is sealed by the valve, and the first volume produced between the connecting channel and the oil inlet is larger than the second volume removed from between the connecting channel and the oil outlet, such that the difference between the first volume and the second volume creates a depressurized volume for accommodating oil. Therefore, the pressure at the oil outlet channel can be decreased to slightly loosen the bicycle caliper, such that the bicycle wheel can be released and able to rotate, avoiding the bicycle wheel from being locked up due to applying brakes too hard or too suddenly and thereby preventing the rider from losing control of the bicycle.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. An anti-lock brake device for bicycle, comprising:
   an oil pressure tank, having an accommodation space, an oil inlet channel, and an oil outlet channel, wherein the oil inlet channel and the oil outlet channel are connected to the accommodation space;
   a valve, slidably located in the oil inlet channel and configured to seal or open an oil inlet of the oil inlet channel; and
   a movable component, located in the accommodation space, wherein the movable component has a connecting channel penetrating through the movable component, two opposite ends of the connecting channel respectively correspond to the oil inlet and an oil outlet of the oil outlet channel, the movable component is slidable between an initial position and a depressurized position, and the movable component in the depressurized position is located closer to the oil outlet channel than that in the initial position;
   wherein when the movable component is in the initial position, the movable component presses against the valve so as to open the oil inlet; when the movable component is slid from the initial position to the depressurized position, the movable component is moved away from the valve, the valve seals the oil inlet, a first volume is produced between the connecting channel and the oil inlet, and a second volume is removed from between the connecting channel and the oil outlet;
   wherein the first volume is larger than the second volume, and a difference between the first volume and the second volume creates a depressurized volume.

2. The anti-lock brake device according to claim 1, wherein a maximum width of the oil inlet channel is larger than a maximum width of the valve, and a width of the oil inlet is smaller than the maximum width of the valve.

3. The anti-lock brake device according to claim 2, wherein the valve comprises a wide portion and a narrow portion connected to each other, a width of the wide portion of the valve is larger than a width of the narrow portion of the valve, the oil inlet channel has a wide portion and a narrow portion connected to each other, a width of the wide portion of the oil inlet channel is larger than a width of the narrow portion of the oil inlet channel, the narrow portion of the oil inlet channel is located between and connected to the wide portion of the oil inlet channel and the accommodation space, the oil inlet is located at the narrow portion of the oil inlet channel, the width of the wide portion of the valve is smaller than the width of the wide portion of the oil inlet channel and is larger than the width of the narrow portion of the oil inlet channel, the width of the narrow portion of the valve is smaller than the width of the narrow portion of the oil inlet channel, and the narrow portion of the valve is slidably located in the narrow portion of the oil inlet channel.

4. The anti-lock brake device according to claim 1, wherein the movable component has a press portion located at the connecting channel, when the movable component is in the initial position, the press portion of the movable component presses against the valve; when the movable component is slid from the initial position to the depressurized position, the press portion of the movable component is moved away from the valve.

5. The anti-lock brake device according to claim 1, wherein the oil pressure tank comprises a main body, a mount component and a first pipe connector, the mount component is mounted on the main body, the mount component and the main body together form the accommodation space, the oil inlet channel penetrates through the mount component, the mount component and the movable component together form a first chamber therebetween, the first pipe connector is mounted on the main body, the oil outlet channel penetrates though the first pipe connector, the movable component and the first pipe connector together form a second chamber therebetween; when the movable component is slid from the initial position to the depressurized position, the first chamber gains the first volume, and the second chamber loses the second volume.

6. The anti-lock brake device according to claim 5, wherein the mount component comprise a plate portion and a guide pillar portion, the plate portion is mounted on the main body, the plate portion and the main body together form the accommodation space therebetween, the guide pillar portion is connected to the plate portion and is located in the accommodation space, the oil inlet channel penetrates through the plate portion and the guide pillar portion, the movable component comprises a driven part and a protrusion part connected to each other, the connecting channel penetrates through the driven part and the protrusion part, the driven part has a guide recess connected to the connecting channel, the guide pillar portion is mounted in the guide recess, and the first chamber is formed between the oil inlet and the connecting channel at the guide recess.

7. The anti-lock brake device according to claim 6, wherein the accommodation space has a first accommodation portion and a second accommodation portion connected to each other, the driven part of the movable component is located in the first accommodation portion, the protrusion part is located in the second accommodation portion, and the second chamber is formed between the oil outlet and the connecting channel at the second accommodation portion.

8. The anti-lock brake device according to claim 7, wherein the guide recess has a wide portion and a tapered portion connected to each other, the tapered portion is located between and connected to the wide portion of the guide recess and the connecting channel, a width of the tapered portion decreases towards the connecting channel, a width of the wide portion of the guide recess is larger than a width of the second chamber, and the tapered portion is partially narrower than the second chamber.

9. The anti-lock brake device according to claim 7, wherein the first pipe connector has a stop surface facing the protrusion part, the stop surface is located at a position where the oil outlet channel is connected to the second accommodation portion, and the stop surface surrounds the oil outlet; when the movable component is in the depressurized position, the protrusion part is in contact with the stop surface.

10. The anti-lock brake device according to claim 6, further comprising a magnetic force generator, wherein the magnetic force generator is disposed in the accommodation space and surrounds the driven part, the magnetic force generator is configured to generate a magnetic force to slide the movable component from the initial position to the depressurized position.

11. The anti-lock brake device according to claim 10, further comprising a magnetically conductive plate, wherein the magnetically conductive plate is sleeved on the driven part, the magnetically conductive plate, the main body and the driven part are made of a magnetically conductive material, and the magnetic force is configured to be applied on the driven part via the main body and the magnetically conductive plate.

12. The anti-lock brake device according to claim 11, wherein the driven part comprises a cylinder portion and a flange portion, the flange portion protrudes from the cylinder portion along a radial direction of the cylinder portion, the cylinder portion is connected to the protrusion part, the connecting channel penetrates through the cylinder portion, the guide recess is located at the cylinder portion, the magnetically conductive plate is sleeved on the cylinder portion, the magnetically conductive plate has an inclined surface, the inclined surface faces the flange portion, and the inclined surface and an central line of the cylinder portion together form an acute angle therebetween.

13. The anti-lock brake device according to claim 11, wherein the magnetic force generator comprises a magnetic coil and a spool, the magnetic coil is wound on the spool, the spool is sleeved on the driven part, and the magnetically conductive plate is in contact with a side of the spool.

14. The anti-lock brake device according to claim 13, wherein the spool comprises a shaft part, a first plate part and a second plate part, the shaft part is located between and connected to the first plate part and the second plate part, the first plate part and the second plate part are wider than the shaft part, the magnetic coil is wound on the shaft part and located between the first plate part and the second plate part, the second plate part is in contact with the magnetically conductive plate, the main body has an annular inner surface and an annular positioning block, the annular inner surface surrounds the accommodation space and the annular positioning block, and the first plate part is located between the annular positioning block and the annular inner surface.

15. The anti-lock brake device according to claim 14, wherein the main body further has an inner side surface, the inner side surface is located between and connected to the annular positioning block and the annular inner surface, each of the first plate part and the second plate part has an annular protrusion, and the two annular protrusions are respectively in contact with the inner side surface of the main body and the magnetically conductive plate.

16. The anti-lock brake device according to claim 11, wherein the mount component further includes an annular wall portion, the annular wall portion and the guide pillar portion are connected to a same surface of the plate portion, the annular wall portion surrounds the guide pillar portion, the magnetically conductive plate has a first positioning protrusion located at a surface of the magnetically conductive plate facing the plate portion of the mount component, the annular wall portion has a second positioning protrusion, and the second positioning protrusion is in contact with the first positioning protrusion.

17. The anti-lock brake device according to claim 16, wherein the second positioning protrusion is located closer to the guide portion of the mount component than the first positioning protrusion.

18. The anti-lock brake device according to claim 6, further comprising a circuit board, wherein the mount component further comprises a mount pillar portion, the plate portion of the mount component is located between and connected to the guide pillar portion and the mount pillar portion, and the mount pillar portion is disposed through the circuit board.

19. The anti-lock brake device according to claim 18, further comprising a fix sleeve, wherein the mount pillar portion has a protrusion portion, the fix sleeve is sleeved on the mount pillar portion, and the circuit board is located between and clamped by the fix sleeve and the protrusion portion of the mount pillar portion.

20. The anti-lock brake device according to claim 19, further comprising a water- proof cover, wherein the water-proof cover is mounted on a side of the main body away from the first pipe connector and is in contact with a side of the fix sleeve away from the circuit board.

21. The anti-lock brake device according to claim 6, further comprising an elastic component, wherein the elastic component is disposed on the valve, and is configured to force the valve to seal the oil inlet.

22. The anti-lock brake device according to claim 21, wherein the oil pressure tank further comprises a second pipe connector, the mount component further include a mount pillar portion, the plate portion of the mount component is located between and connected to the guide pillar portion and the mount pillar portion, the second pipe connector is mounted on the mount pillar portion, the oil inlet channel penetrates through the second pipe connector and the mount pillar portion, the second pipe connector has a contact surface, the contact surface faces the valve, the elastic component is a compression spring, and two opposite ends of the elastic component respectively press against the contact surface of the second pipe connector and the valve.

23. The anti-lock brake device according to claim 6, further comprising an elastic component, wherein the elastic component is disposed on the protrusion part of the movable component, and the elastic component is configured to force the protrusion part to slide toward the valve.

24. The anti-lock brake device according to claim 23, wherein the first pipe connector has a contact surface, the contact surface of the first pipe connector faces the protrusion part, the elastic component is a compression spring, and two opposite ends of the elastic component respectively press against the contact surface of the first pipe connector and the protrusion part.

25. The anti-lock brake device according to claim 1, further comprising a magnetic force generator, wherein the magnetic force generator is disposed in the accommodation space and surrounds the movable component, the magnetic force generator is configured to generate a magnetic force to slide the movable component from the initial position to the depressurized position, and the movable component surrounds at least part of the valve.

\* \* \* \* \*